Figure 1:
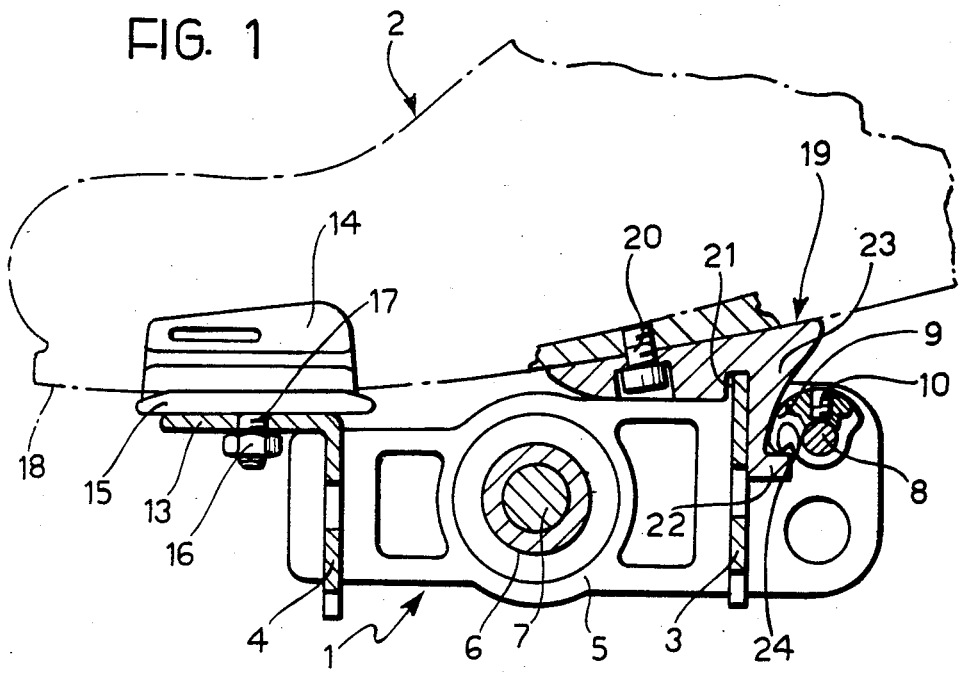

United States Patent [19]

Rapisarda

[11] Patent Number: 4,646,586
[45] Date of Patent: Mar. 3, 1987

[54] DEVICE FOR CONNECTING A BICYCLE PEDAL TO A CYCLING SHOE

[76] Inventor: Antonio Rapisarda, Via Fidia 2, Turin, Italy

[21] Appl. No.: 738,834

[22] Filed: May 29, 1985

[30] Foreign Application Priority Data

Jun. 1, 1984 [IT] Italy .................................. 67570 A/84

[51] Int. Cl.⁴ ............................................. G05G 1/14
[52] U.S. Cl. ..................... 74/594.6; 36/131; 280/623
[58] Field of Search ............... 280/627, 623, 611; 74/594.6; 36/131

[56] References Cited

U.S. PATENT DOCUMENTS 3,964,343  6/1976  Lauterbach ..................... 74/594.6

FOREIGN PATENT DOCUMENTS 1050579   3/1979  Canada ............................ 280/623
146454    6/1985  European Pat. Off. ............ 74/594.6
WO84/03050 8/1984 PCT Int'l Appl. ............... 280/623

Primary Examiner—Larry I. Schwartz
Attorney, Agent, or Firm—McCormick, Paulding & Huber

[57] ABSTRACT

The device is for connecting a bicycle pedal with a cage structure to a cycling shoe with a stud which is attached beneath the sole and has a transverse groove for engaging the rear cross member of the pedal. The device includes a stop member carried by the stud of the shoe and a bolt locking member which is carried by the pedal and is arranged to cooperate with the stop member so as to keep the stud in engagement with the rear cross member of the pedal.

5 Claims, 9 Drawing Figures

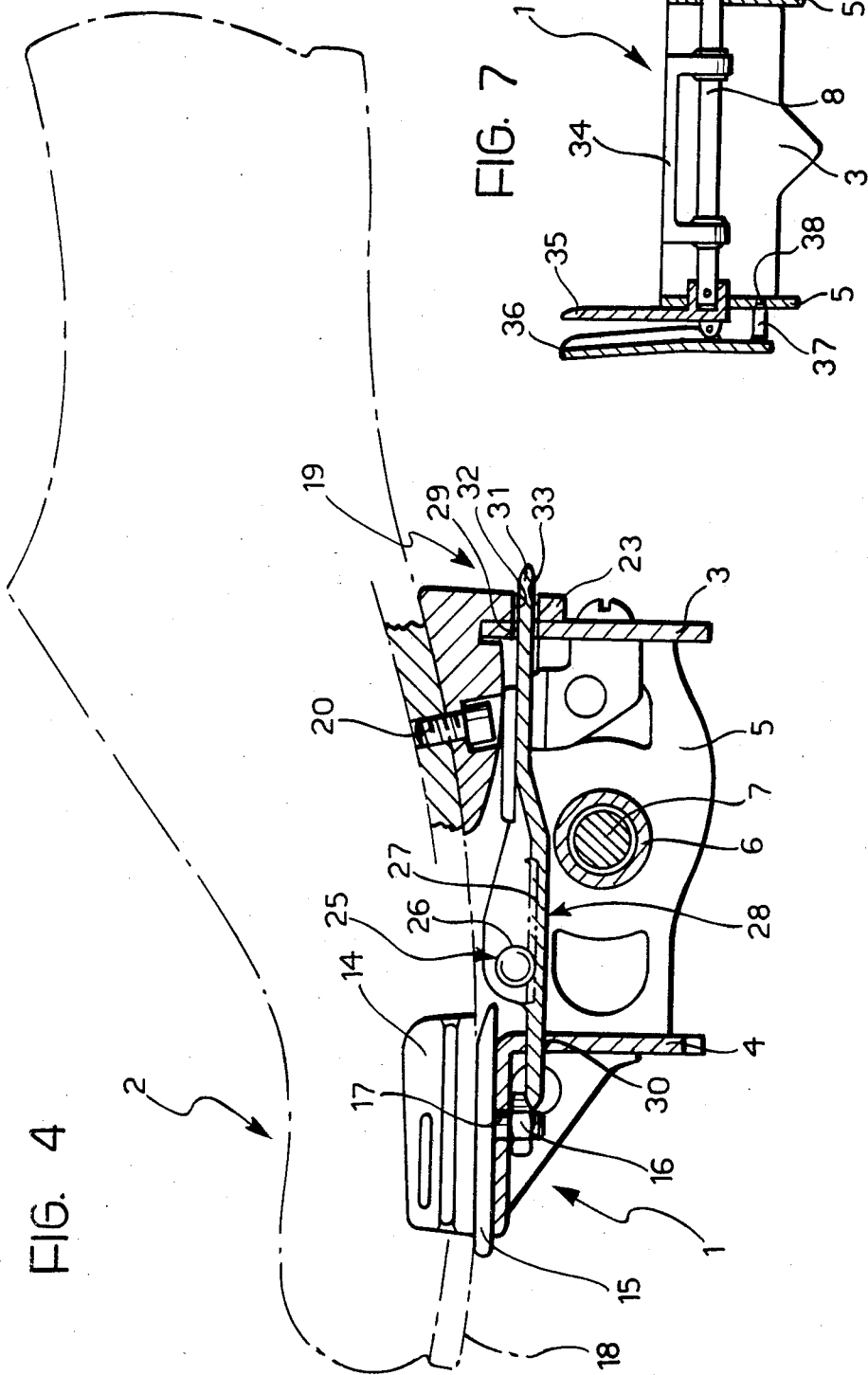

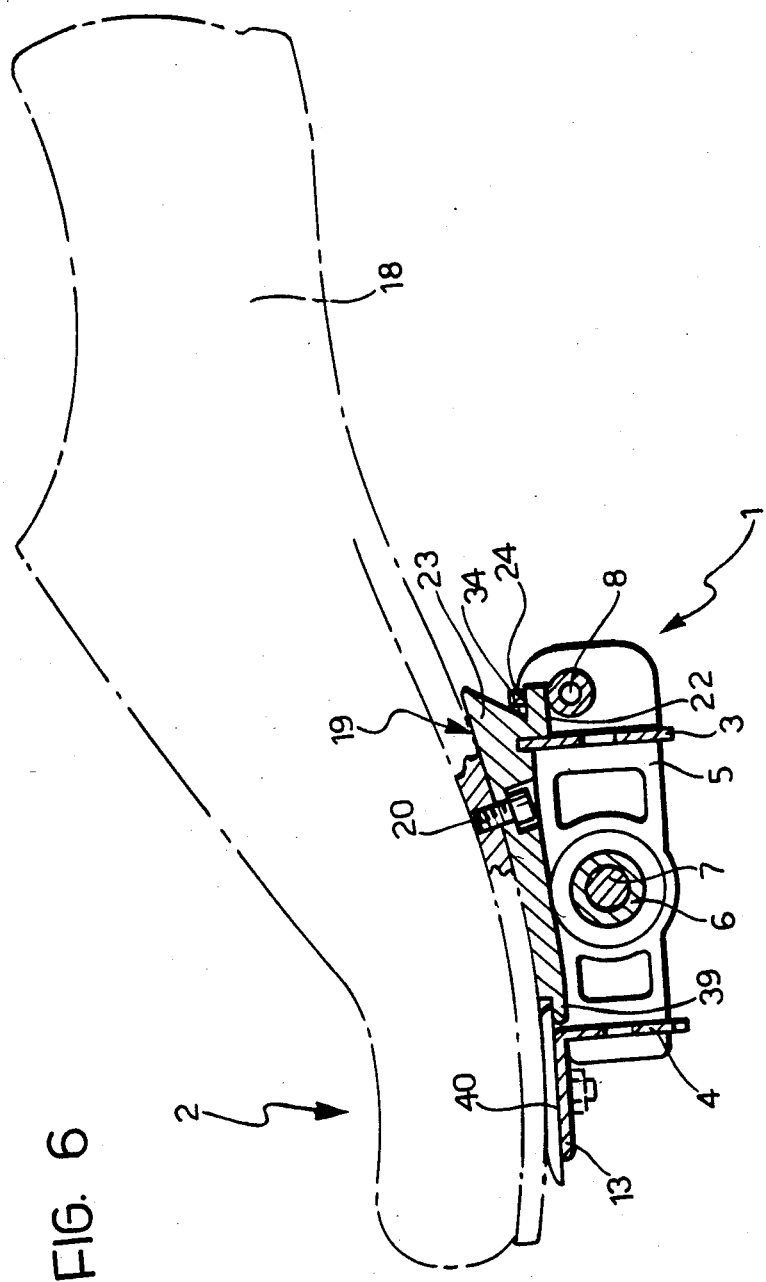

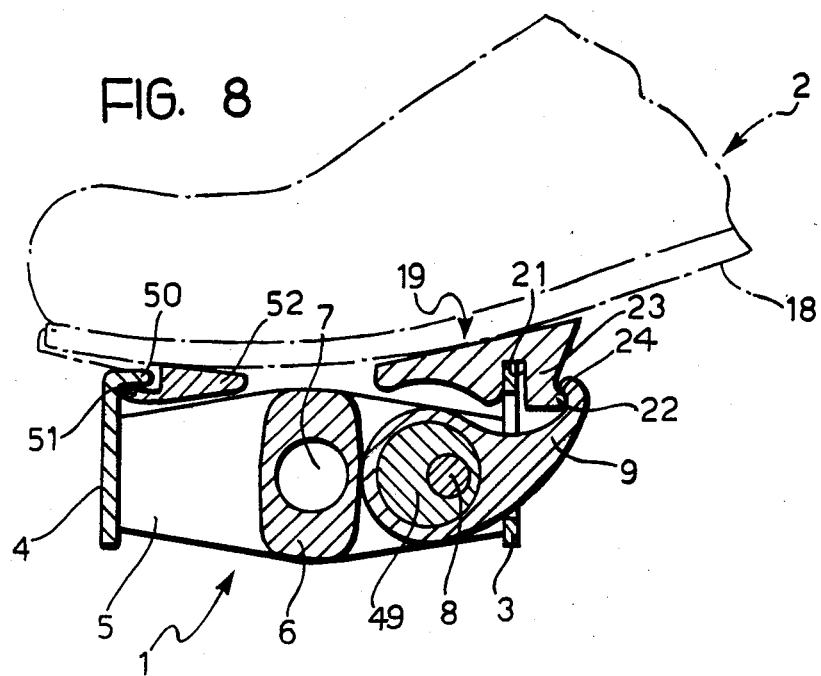
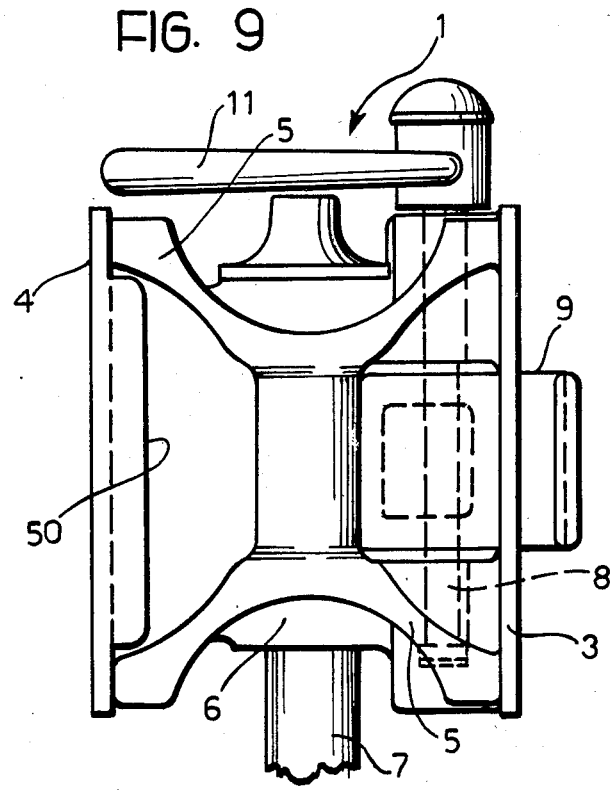

DEVICE FOR CONNECTING A BICYCLE PEDAL TO A CYCLING SHOE

The present invention relates generally to the field of bicycles, and more particularly to devices for connecting a bicycle pedal to a cycling shoe.

Conventionally, in bicycles provided with such devices, the pedals have a cage structure with respective front and rear cross members of which the former is arranged to cooperate with a stud with a transverse groove fixed to the sole of the cycling shoe. The coupling of the cross member of the pedal and the stud is a simple form coupling and has the function of preventing sliding of the shoe forwardly or rearwardly relative to the pedal. In order to lock the shoe completely to the pedal, a toe clip is provided which projects from the front cross member and is arranged to receive the front part of the shoe, to which a strap with a tightening buckle is attached.

This system is decidedly inconvenient and impractical, particularly because of the difficulties connected with the tightening and unfastening of the strap. Thus, it is accepted by those who practice competitive cycling but it is rarely accepted by touring cyclists.

Various solutions have been proposed recently for making the connection of the shoe to the bicycle pedal simpler and more convenient, the most interesting of these being described and illustrated in European Patent Applications Nos. EP-A-15803, EP-A-58438 and EP-A-94276.

All these solutions have in common the fact that they eliminate the strap and stud attached to the shoe and modify radically the structure of the pedal and the form of the shoe, particularly with regard to the sole.

In particular, in No. EP-A-94276 the cage structure of the pedal is replaced by a footrest which has lateral and possibly front guides for cooperating with corresponding projections or recesses specially provided in the sole of the shoe, and is provided with a bolt locking member movable perpendicular to the footrest to engage a corresponding notch or stop projection expressly provided in the sole of the shoe.

Even this system is not very acceptable to cyclists in that it is expensive and, in particular, requires the use of special shoes which can only be used with the respective special pedals.

Moreover, this solution is not very practical and convenient in that the fitting of the shoe onto the pedal platform and its positioning relative to the lateral guides and the bolt is anything but easy. Even the release of the shoe from the pedal may present problems, particularly when the cyclist's foot must be freed quickly in dangerous situations.

The broad object of the present invention is to provide a device for connecting a bicycle pedal to a cycling shoe by bolt locking means carried by the pedal and arranged to cooperate with complementary catch means carried by the sole of the shoe, which is free from the disadvantages mentioned above.

A more particular object of the invention is to provide a device of the type defined above which may be applied to normal, existing bicycle pedals without requiring the use of special cycling shoes.

Another object of the invention is to provide a device of the aforesaid type which effectively makes the operations of locking and releasing the cyclist's foot more convenient, easier and safer.

The invention thus has as its subject a device for connecting a bicycle pedal to a cycling shoe, comprising bolt locking means carried by the pedal and arranged to cooperate with complementary catch means carried by the sole of the shoe, characterised in that:
- the pedal has a conventional substantially cage-like structure with respective rear and front cross members,
- the cycling shoe has a conventional form and, in known manner, has a stud which is attached beneath the sole and has a transverse groove for engaging the rear cross member of the pedal in known manner, and
- the catch means of the shoe are carried by the stud and the bolt locking means act on these means to keep the stud in engagement with the rear cross member of the pedal.

According to the invention, the catch means of the shoe are constituted by a reaction surface engageable from above by the bolt locking means in use.

Conveniently, this reaction surface is formed on an appendage of the stud which can abut frontally the rear cross member of the pedal.

According to a first embodiment of the invention, the reaction surface is defined by a projection on the appendage of the stud.

In this case, the bolt locking means are constituted by an eccentric stop carried by a shaft rotatably mounted parallel to and adjacent the rear cross member and rotatable by manual operating means between a rest position in which the eccentric does not interfere with the projection of the stud, and an operative position in which the eccentric abuts on the projection from above.

According to a variant of the invention, the reaction surface is defined by a recess formed in the appendage of the stud.

In this case, the bolt locking means are constituted by a plate-shaped stop supported by the pedal so as to be slidable by manually operable means between a rest position in which the plate does not interfere with the recess, and an operative position in which the plate is inserted in the recess.

According to a further aspect of the invention, the device also includes adjustable lateral retaining means for preventing lateral sliding of the stud relative to the rear cross member of the pedal.

Figure 2:
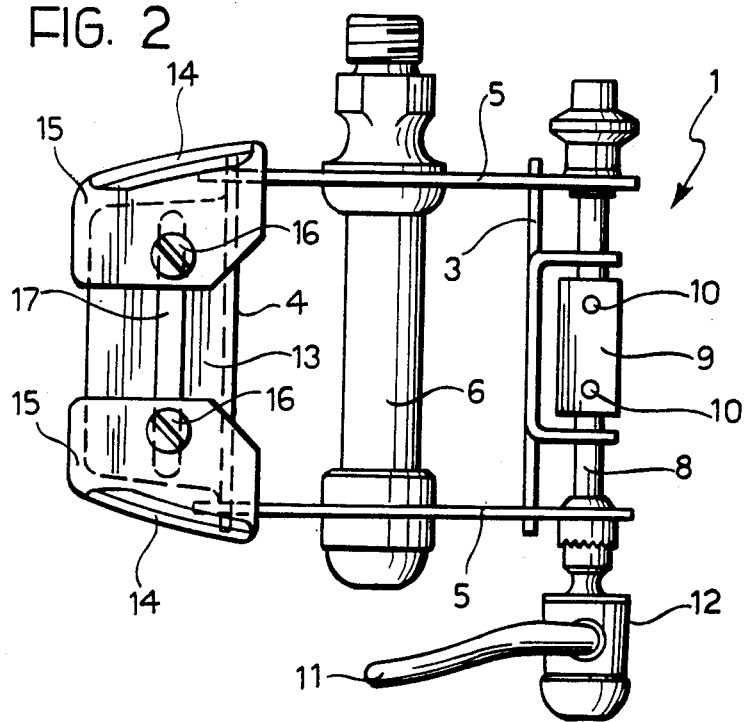
Figure 3:
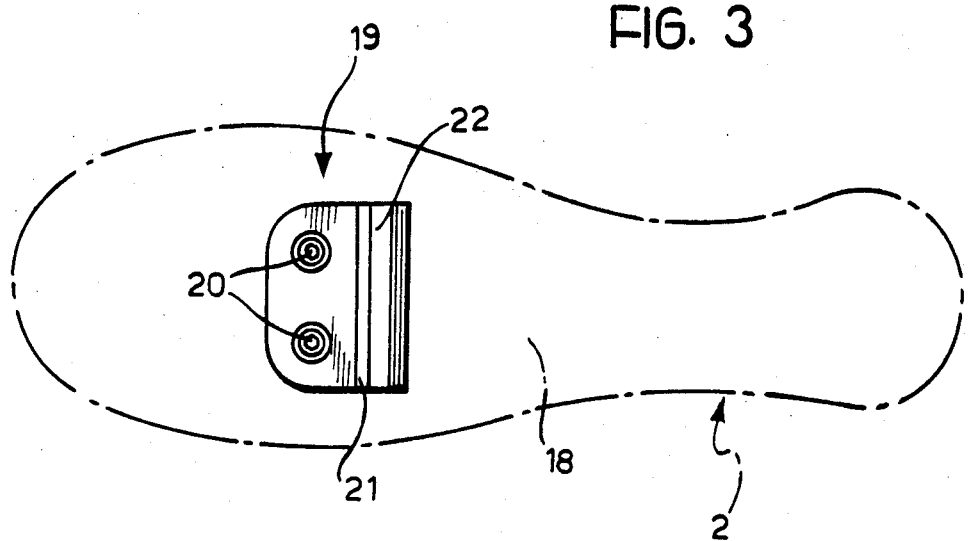
Figure 5:
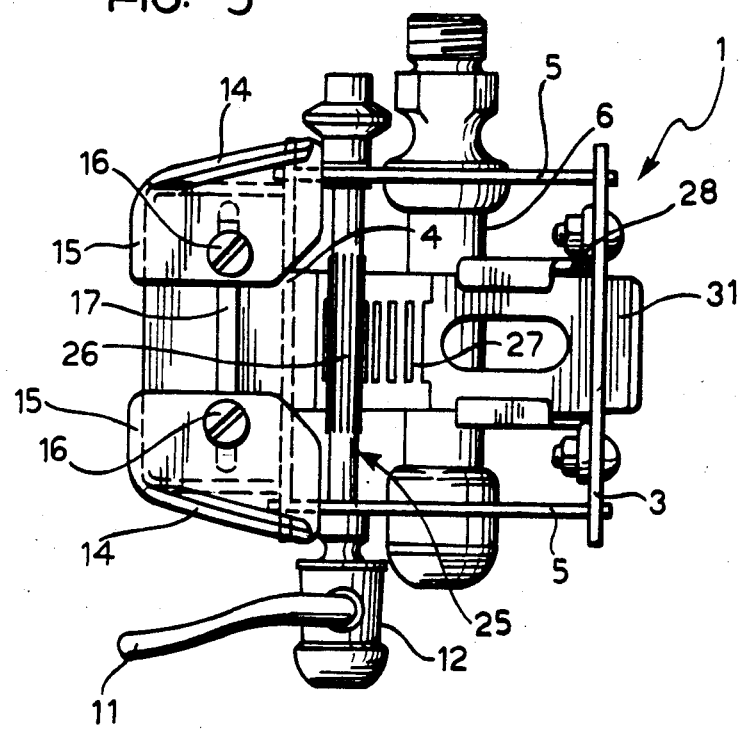

Further characteristics of the invention will become evident from the detailed description which follows with reference to the appended drawings provided purely by way of non-limiting example, in which:

FIG. 1 is a schematic vertical part-sectional view of a pedal-shoe device according to the invention, FIG. 2 is a plan view of the pedal of FIG. 1 from above, FIG. 3 is a plan view of the shoe illustrated in FIG. 1 from below, FIG. 4 shows a first variant of FIG. 1, FIG. 5 is a plan view of the pedal of FIG. 4 from above, FIG. 6 illustrates a second variant of FIG. 1, FIG. 7 is a cross-section of the pedal of FIG. 6, FIG. 8 shows a third variant of FIG. 1, and FIG. 9 is a plan view of FIG. 8 from above.

In the following description, the terms horizontal and vertical, upper and lower, front and rear, and the like are intended to refer to the condition assumed by the device during use, as illustrated in the drawings.

Referring initially to FIGS. 1 to 3, a bicycle pedal is indicated 1 and a cycling shoe which is connected to the pedal 1 by a connecting device according to the invention is indicated 2.

The pedal 1 has a conventional metal structure of the so-called "cage" type, that is, formed by a rear cross member 3 and a front cross member 4 interconnected at their ends by side plates 5 and carrying a central tubular support 6 in which a shaft 7 for connecting the pedal to the pedal crank of the bicycle is mounted. The rear end portions of the side plates 5 rotatably support a shaft 8 located parallel to the rear cross member 3 and carrying an eccentric cam member 9 at its centre. In the embodiment illustrated, the eccentric 9 is fixed to the shaft 8 by threaded pins 10.

The shaft 8 can be rotated manually between an operative position corresponding to the angular position of the eccentric 9 illustrated in FIG. 1, and an inoperative position in which the eccentric cam 9 is rotated in a clockwise sense through an angle of about 90° or more. This rotation is effected by means of a side lever 11 which is associated with an eccentric locking device, generally indicated 12, of the conventional type used for locking the spindles of bicycle wheels.

The front cross member 4 has an upper horizontal bracket appendage 13 carrying two lateral jaws 14 which converge forwardly. The two jaws 14 are carried by respective plates 15 adjustably connected to the bracket 13 by respective screws 16 inserted in a slot 17 in the bracket 13.

The shoe 2 is an ordinary cycling shoe to the sole 18 of which is fixed, in known manner, a stud 19 which is normally of high-strength plastics or metal. The stud 19, which is usually fixed to the sole 18 by screws 20, has, in known manner, a transverse groove 21 with a shape complementary to that of the upper edge of the rear cross member 3. In effect, as known, the groove 21 is adapted to be engaged by the upper edge of the member 3 to prevent forward and rearward sliding of the shoe 2 relative to the pedal 1.

The part of the device according to the invention which concerns the shoe 2 is constituted, in the embodiment being described, by a projection 22 facing towards the rear of the shoe and formed at the bottom of a rear appendage 23 of the stud 19, of which the face opposite the projection 22 is disposed as an extension of the corresponding wall of the groove 21. The face of the projection 22 facing the sole 18 defines a reaction surface 24.

No other modification of the shoe is needed for the device according to the invention; consequently, it is possible to use any cycling shoe in which the conventional stud has been replaced by the stud 19 described above.

As regards the part of the device relating to the pedal 1, it should be noted that the shaft 8 with the eccentric cam 9 and the bracket 13 with the jaws 14 may be attached relatively simply and cheaply to ordinary bicycle pedals which already have an existing cage structure. On the other hand, as will become apparent from the following, the jaws 14 are not strictly necessary.

In order to lock the shoe 2 to the pedal 1 in the manner illustrated in FIG. 1, it suffices to rest the sole 18 on the bracket 13, positioning the front part of the shoe between the two jaws 14. The latter will have been adjusted beforehand so that, with the shoe in this position, the groove 21 in the stud 19 corresponds with the upper edge of the cross member 3 of the pedal 1. Then, the shaft 8 being kept in the inoperative position defined previously, the sole 18 is lowered until the upper edge of the cross member 3 engages the groove 21, the front face of the appendage 23 being located against the rear face of the cross member 3.

At this point, it suffices to rotate the shaft 8 towards the operative position illustrated in FIG. 1, in order bring the active part of the cam 9 into contact with the reaction surface 24 of the projection 22.

In this position the shoe 2 is locked firmly to the pedal 1 since the cam 9 holds the stud 19 in engagement with the upper edge of the cross member 3, preventing it from moving away in a vertical direction.

Separation of the stud 19 from the cross member 3 by upward rotation of the toe of the shoe is prevented by the frontal abutment of the appendage 23 against the cross member 3.

It will be apparent that the jaws 14 have no part in the locking of the shoe 2 to the pedal 1; their sole function is, in effect, that of preventing sliding of the stud 19 along the upper edge of the cross member 3 or lateral movements of the shoe relative to the pedal.

As stated above, the jaws 14 could be dispensed with and replaced by equivalent means having the same function.

Accordingly to a particularly advantageous solution, such equivalent means could be replaced by simple screw clamps (not illustrated) fitted directly to the upper edge of the rear cross member 3 and bearing against opposite sides of the stud 19. The position of these clamps will thus be adjustable, just like the jaws 14 described above, so as to allow variations in the angle of the shoe 2 relative to the pedal 1 in the locked position, according to the users' requirements.

The device described with reference to FIGS. 1 to 3 can be varied in many other ways. One of these could consist, for example, of the location of the shaft 8 with its eccentric cam 9 in front of the rear cross member 3 instead of behind it as illustrated in FIGS. 8 and 9.

In this variant, which should be considered to be the preferred embodiment of the invention, and in which parts identical to or similar to those already described are indicated by the same reference numerals, the cam 9 extends towards the rear part of the pedal through the cross member 3 so as to be engageable with the projection 22 of the stud 19 in the manner explained above. The cam is controlled by the shaft 8 which passes eccentrically through a sleeve 49 in the cam itself. The shaft 8 is operated manually by means of a side lever 11 similar to that described above. The jaws of the embodiment described above are not present and their function is fulfilled by a stop member 50 formed at the top of the front cross member 4. This stop member 50 is engageable from below by part of a toothed catch member 51 formed on an element 52 attached to the sole of the shoe 2 in front of the stud 19. The element 52 may be distinct and separate from stud 19, as illustrated, or may be formed integrally therewith.

A further variant is illustrated in FIGS. 4 and 5, in which parts identical to or similar to those already described with reference to FIGS. 1 to 3 are indicated by the same reference numerals.

In this case, the shaft 8 with the cam eccentric 9 is omitted while a shaft 25 is provided which is supported by the side plates 5 close to the front cross member 4. The shaft 25 can be rotated by means of a lever 11 associated with a locking device 12 similar to those described above, and has a central toothed part 26 which meshes with a rack 27 formed on the upper face of a plate 28 guided for horizontal sliding movement through slots 29 and 30 in the cross members 3 and 4.

The rear part of the plate 28 constitutes a stop member 31 for the locking of the stud 19.

The latter does not have the projection 22 in this case and its appendage 23 has a slot 32 defined at its lower end by a surface 33 whose function is equivalent to that of the reaction surface 24 of the embodiment described above.

The position of the slot 32 is such that, in the position in which the shoe 2 bears on the pedal 1, illustrated in FIG. 4, it is aligned with the slot 29 in the rear cross member 3. The shaft 25 may be rotated between an inoperative position corresponding to an advanced condition of the plate 28 in which its stop end 31 is moved into a position such as to allow the correct positioning of the stud 19, and an operative position corresponding to a withdrawn position of the plate 28 in which its stop end 31 passes through the slot 32 in the stud 19. In this position, the separation of the shoe 2 from the pedal 1 is prevented in a manner entirely equivalent to that described above; separation by vertical movement is prevented by the end 31 of the plate 28, while rotation of the toe of the shoe in the clockwise sense is prevented by the abutment of the appendage 23 against the rear face of the cross member 3.

Again in this embodiment, the jaws 14 may be omitted and replaced by lateral retaining means of the type described above.

The variant illustrated in FIGS. 6 and 7 is generally similar to the embodiment described with reference to FIGS. 1 to 3 and only the differences will be described in detail, the same reference numerals again being used in this case for identical or similar parts.

In this variant, the locking cam carried by the shaft 8 is constituted, instead of by the eccentric 9, by a goose-necked member 34 arranged to engage and laterally surround the projection 22 of the stud 19.

In this case, the rotation of the shaft 8 between the operative position and the inoperative position is effected by means of a lever 35 associated with a rocker arm 36 which carries a stop pin 37 engageable, in the operative position, with a recess 38 in the inner side plate 5 (FIG. 7). Again this variant, the two jaws 14 are omitted and the sole 18 of the shoe 2 has a tooth-shaped catch member 39 at its front end for engaging the underside of a stop member 40 fixed to the bracket 13. In practice, the upward engagement of the catch tooth 39 against the stop plate 40 ensures secure and firm locking of the sole 18 so as more effectively to prevent upward rotation of the toe of the shoe. This device reduces the length of the appendage 23 of the stud 19 which thus facilitates any walking by the cyclist wearing the shoes 2.

According to FIG. 6, the catch member 39 is formed integrally with the front part of the stud 19. It should be noted, however, that the stop member could be constituted by one or more pieces side by side and distinct and separate from the stud 19.

In the embodiment of FIG. 6, as in the variants described previously, the bracket 13 of the pedal 1 may be provided with a safety strap for retaining the toe of the shoe.

Lastly it must be pointed out that the stop member 40 or 50 and the catch member 39 or 51 could be employed also with a traditional retaining system for the shoe of the strap type, i.e. without the use of a bolt locking device.

Naturally, constructional details and forms of embodiment may be varied widely with respect to that described and illustrated, without thereby departing from the scope of the present invention.

What is claimed is:

1. A device for connecting a bicycle pedal having a cage-like structure including rear and front cross numbers to a cycling shoe having a sole, said device comprising bolt locking means carried by the pedal and complementary catch means carried by the sole for cooperating with the bolt locking means, wherein: the catch means is defined by a stud attached beneath the sole, said stud has an appendage defining a frontal surface for abutting said rear cross member, said stud defines a transverse groove for receiving said rear cross member therein, said stud includes a projection on said appendage defining a reaction surface engagable from above by said bolt locking means, and said bolt locking means has a shaft rotatably mounted on said pedal in front of and parallel to said rear cross member, an eccentric cam carried by said shaft, and manually operable means for rotating said shaft between a rest position wherein said eccentric cam does not interfere with the projection on said stud and an operative position wherein said eccentric cam abuts said projection and engages said reaction surface from above to keep said stud in engagement with said rear cross member.

2. A device according to claim 1, wherein the manual operating means have associated means for locking it in the operative position.

3. A device according to claim 1, further including means for anchoring the toe of the shoe to the pedal.

4. A device according to claim 3, wherein the anchoring means include a stop member carried by the front cross member of the pedal and a catch member fixed to the sole of the shoe and arranged to abut the stop member from below.

5. A device according to claim 4, wherein the stop member is distinct and separate from the stud.

* * * * *